US012783390B2

(12) United States Patent
Gaikwad et al.

(10) Patent No.: US 12,783,390 B2
(45) Date of Patent: Nov. 3, 2026

(54) DYNAMIC TEST SELECTION AND PRIORITIZATION USING ASSOCIATION RULE MINING FOR CONTINUOUS INTEGRATION

(71) Applicant: Dell Products L.P., Round Rock, TX (US)

(72) Inventors: Hemant Gaikwad, Pune (IN); Jagadeesh Venugopal, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 18/650,368

(22) Filed: Apr. 30, 2024

(65) Prior Publication Data

US 2025/0335339 A1 Oct. 30, 2025

(51) Int. Cl.
*G06F 11/3668* (2025.01)

(52) U.S. Cl.
CPC ...... *G06F 11/3684* (2013.01); *G06F 11/3676* (2013.01); *G06F 11/3688* (2013.01); *G06F 11/3692* (2013.01)

(58) Field of Classification Search
CPC ............. G06F 11/3676; G06F 11/3684; G06F 11/3688; G06F 11/3692
See application file for complete search history.

(56) References Cited

U.S. PATENT DOCUMENTS

| | | | | |
|---|---|---|---|---|
| 9,870,314 | B1 * | 1/2018 | Vyas | G06F 11/3698 |
| 10,983,903 | B1 * | 4/2021 | Yawalkar | H04L 43/50 |
| 2018/0052763 | A1 * | 2/2018 | Green | G06F 11/3672 |
| 2020/0057678 | A1 * | 2/2020 | Duale | G06F 9/5077 |
| 2020/0272559 | A1 * | 8/2020 | Ahluwalia | G06N 20/00 |
| 2020/0371902 | A1 * | 11/2020 | Mangione-Tran | G06F 11/3688 |
| 2022/0207618 | A1 * | 6/2022 | Sharnoff | G06F 16/2379 |

(Continued)

OTHER PUBLICATIONS

Acharya, Arup Abhinna, Prateeva Mahali, and Durga Prasad Mohapatra. "Model based test case prioritization using association rule mining." Computational Intelligence in Data Mining—vol. 3: Proceedings of the International Conference on CIDM, Dec. 20-21, 2014. New Delhi: Springer India, 2014. (Year: 2014).*

(Continued)

*Primary Examiner* — Jay A Morrison
(74) *Attorney, Agent, or Firm* — Krishnendu Gupta; Lesley Leonessa

(57) ABSTRACT

Methods, system, and non-transitory processor-readable storage medium for a test selection and prioritization system are provided herein. An example method includes mining, by the system, a test case repository comprising test cases and execution results, to identify relationships between test cases based on the execution of the test cases according to a test case execution plan. The system creates a first test case execution plan comprising a first subset of the test cases based on the identified relationships. A test management system executes the first subset of the test cases according to the first test case execution plan on at least one test system. The system assesses results of the execution of the first subset to identify a second test case execution plan, where the second test case execution plan results in test execution failures occurring earlier than test cases executed according to the test case execution plan.

20 Claims, 9 Drawing Sheets

(56) References Cited

U.S. PATENT DOCUMENTS

| | | | | |
|---|---|---|---|---|
| 2023/0010781 | A1* | 1/2023 | Ningappa | G06F 11/3698 |
| 2024/0303185 | A1* | 9/2024 | Boué | G06F 11/3684 |
| 2024/0330169 | A1* | 10/2024 | Hicks | G06F 40/20 |

OTHER PUBLICATIONS

Yu, Zhe, et al. "Terminator: Better automated ui test case prioritization." Proceedings of the 2019 27th ACM Joint Meeting on European Software Engineering Conference and Symposium on the Foundations of Software Engineering. 2019. (Year: 2019).*

* cited by examiner

DYNAMIC TEST SELECTION AND PRIORITIZATION USING ASSOCIATION RULE MINING FOR CONTINUOUS INTEGRATION

FIELD

The field relates generally to prioritizing execution of regression test cases in information processing systems.

BACKGROUND

System test is a critical part of the pre-release quality engineering activities for information processing systems to ensure the quality and reliability of software applications. There may be thousands of system test cases for complicated information processing systems, such as storage products.

SUMMARY

Illustrative embodiments provide techniques for implementing a test selection and prioritization system in a storage system. For example, illustrative embodiments mine, by a test selection and prioritization system, a test case repository to identify relationships between test cases, where the test case repository comprises the test cases and results from execution of the test cases. The identified relationships are based on the execution of the test cases, and the test cases are executed according to a test case execution plan. The test selection and prioritization system creates a first test case execution plan based on the identified relationships, where the test case execution plan comprises a first subset of the test cases. The test management system executes the first subset of the test cases according to the first test case execution plan, where the first subset is executed on at least one test system. The test selection and prioritization system assesses the results of the execution of the first subset to identify a second test case execution plan comprising a second subset of the test cases, where the execution of the second subset of test cases according to the second test case execution plan results in the test execution failures occurring earlier than when the test cases are executed according to the test case execution plan. Other types of processing devices can be used in other embodiments. These and other illustrative embodiments include, without limitation, apparatus, systems, methods and processor-readable storage media.

DETAILED DESCRIPTION

Figure 1:
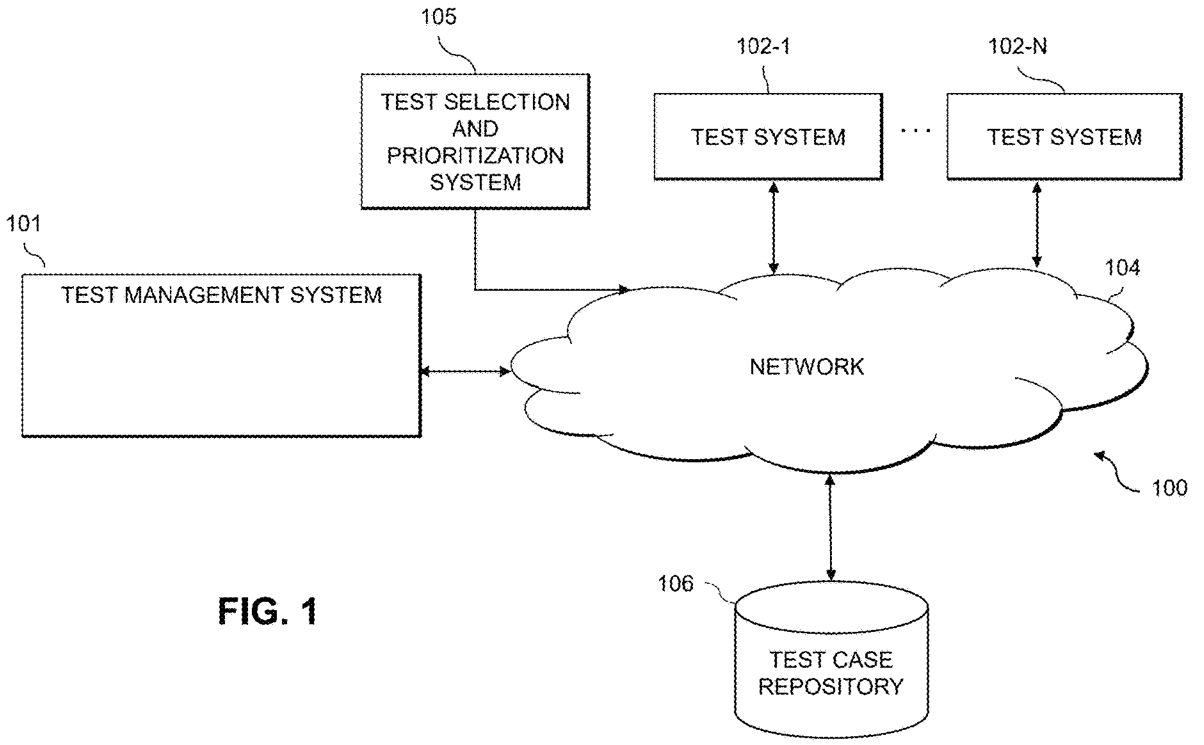
FIG. 1 shows an information processing system including a test selection and prioritization system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a test selection and prioritization system, which technique may be used to provide, among other things intelligent test case selection and prioritization to achieve efficient testing coverage by mining, by a test selection and prioritization system, a test case repository to identify relationships between test cases, where the test case repository comprises the test cases and results from execution of the test cases. The identified relationships are based on the execution of the test cases, and the test cases are executed according to a test case execution plan. The test selection and prioritization system creates a first test case execution plan based on the identified relationships, where the test case execution plan comprises a first subset of the test cases. The test management system executes the first subset of the test cases according to the first test case execution plan, where the first subset is executed on at least one test system. The test selection and prioritization system assesses the results of the execution of the first subset to identify a second test case execution plan comprising a second subset of the test cases, where the execution of the second subset of test cases according to the second test case execution plan results in the test execution failures occurring earlier than when the test cases are executed according to the test case execution plan.

The system test phase of the pre-release quality engineering activities for information processing systems may comprise thousands of test cases. Each new software build increases the number of features, and therefore, increases the number of test cases to validate those new features. Test cases must be executed to ensure that newly implemented features do not impact existing functionality. Yet, resources to execute those regression test cases may be limited. Therefore, it is crucial to prioritize execution of the most valuable test cases (i.e., those test cases considered to be of higher importance than other test cases) first when executing the test suite of test cases. Prioritization of executing the most valuable test cases earlier in the testing cycle results in the detection of more critical issues earlier in the testing phase.

Conventional technologies fail to rank and prioritize test cases so that failures occur quickly and earlier in the testing process. Conventional technologies do not provide a method to rank the test cases to adequately provide testing coverage of the new features in the new product releases, especially when resources are limited. Conventional technologies fail to leverage adaptive association rule mining techniques in the software testing process to identify relevant test cases for execution. Conventional technologies fail to accommodate changes in software and testing contexts, and do not allow for dynamic test selection and prioritization. Conventional technologies use static selection methods, and fail to dynamically select test cases based on specific changes to the software.

By contrast, in at least some implementations in accordance with the current technique as described herein, test cases are ranked and prioritized by mining, by a test selection and prioritization system, a test case repository to identify relationships between test cases, where the test case repository comprises the test cases and results from execution of the test cases. The identified relationships are based on the execution of the test cases, and the test cases are executed according to a test case execution plan. The test selection and prioritization system creates a first test case execution plan based on the identified relationships, where the test case execution plan comprises a first subset of the test cases. The test management system executes the first subset of the test cases according to the first test case execution plan, where the first subset is executed on at least one test system. The test selection and prioritization system assesses the results of the execution of the first subset to identify a second test case execution plan comprising a second subset of the test cases, where the execution of the second subset of test cases according to the second test case execution plan results in the test execution failures occurring earlier than when the test cases are executed according to the test case execution plan.

Thus, a goal of the current technique is to provide a method and a system for a test selection and prioritization system that ranks and prioritizes execution of test cases to quickly detect failures in the test system on which the test cases are executed. Another goal is to leverage adaptive association rule mining techniques in the software testing process to identify relevant test cases. Another goal is to provide a dynamic test selection process that accommodates changes in software and testing contexts, and dynamically selects test cases based on specific changes to the software. Yet another goal is to identify high-priority test cases that will detect critical defects sooner in the testing cycle, thereby reducing the likelihood that the defect will be propagated to later stages of the testing cycle.

In at least some implementations in accordance with the current technique described herein, the use of a test selection and prioritization system can provide one or more of the following advantages: ranking and prioritizing test cases so that failures occur quickly and earlier in the testing process, leveraging adaptive association rule mining techniques in the software testing process to identify relevant test cases for execution, accommodating changes in software and testing contexts, and allowing for dynamic test selection and prioritization, and dynamically selecting test cases based on specific changes to the software.

In contrast to conventional technologies, in at least some implementations in accordance with the current technique as described herein, test case selection is ranked and prioritized by mining, by a test selection and prioritization system, a test case repository to identify relationships between test cases, where the test case repository comprises the test cases and results from execution of the test cases. The identified relationships are based on the execution of the test cases, and the test cases are executed according to a test case execution plan. The test selection and prioritization system creates a first test case execution plan based on the identified relationships, where the test case execution plan comprises a first subset of the test cases. The test management system executes the first subset of the test cases according to the first test case execution plan, where the first subset is executed on at least one test system. The test selection and prioritization system assesses the results of the execution of the first subset to identify a second test case execution plan comprising a second subset of the test cases, where the execution of the second subset of test cases according to the second test case execution plan results in the test execution failures occurring earlier than when the test cases are executed according to the test case execution plan.

In an example embodiment of the current technique, the test selection and prioritization system provides, to the test management system, the second test case execution plan for execution of the second subset of the test cases by the test management system.

In an example embodiment of the current technique, the test selection and prioritization system iteratively mines, creates, executes, and assesses to create an optimized test case execution plan that optimizes early detection of test case failures.

In an example embodiment of the current technique, a data collection module accesses the test cases and the results from the test case repository utilizing application programming interfaces (API) associated with the test management system, where the test selection and prioritization system comprises the data collection module.

In an example embodiment of the current technique, a data grouping module groups the test cases according to a build identifier associated with the test cases, where the test selection and prioritization system comprises the data collection module.

In an example embodiment of the current technique, the data group module groups the test cases according to a time stamp range associated with an execution timestamp associated with the execution of the test cases, where the test selection and prioritization system comprises the data collection module.

In an example embodiment of the current technique, the relationships between the test cases identify sets of co-failing test cases.

In an example embodiment of the current technique, the test selection and prioritization system determines the relationships between the test cases utilizing an association rule mining algorithm.

In an example embodiment of the current technique, the association rule mining algorithm is an Apriori algorithm.

In an example embodiment of the current technique, a failure set generation module determines a plurality of associated failure sets based on the relationships between the test cases, where co-failing test cases are grouped into a respective associated failure set, and where the test selection and prioritization system comprises the failure generation module.

In an example embodiment of the current technique, the associated failure sets comprise itemsets, support, and confidence.

In an example embodiment of the current technique, the test selection and prioritization system creates the first test case execution plan by selecting at least one test case each from at least a subset of the plurality of associated failure sets.

In an example embodiment of the current technique, the test selection and prioritization system selects at least one test case each from at least a subset of the plurality of associated failure sets according to a round robin selection process.

In an example embodiment of the current technique, the test selection and prioritization system selects at least one test case each from at least a subset of the plurality of associated failure sets according to a highest failing frequency associated with each of the test cases in the plurality of associated failure sets.

In an example embodiment of the current technique, the test selection and prioritization system updates the plurality of associated failure sets based on at least one of changes to the test cases and results from execution of the test cases in the test case repository, test cases added to the test case repository and associated results from execution of the added tests, and test cases removed from the test case repository.

In an example embodiment of the current technique, the test selection and prioritization system monitors failures occurring during the execution of the first subset of the test cases according to the first test case execution plan to identify the second test case execution plan comprising the second subset of the test cases.

In an example embodiment of the current technique, the test selection and prioritization system identifies at least one failing test case associated with the first subset of the test cases, where an associated failure set comprises the failing test case, and adds at least one other failing test case from the associated failure set to the second subset of the test cases.

In an example embodiment of the current technique, the test selection and prioritization system monitors at least one of precision, recall, and F-score associated with the failures occurring during the execution of the first subset of the test cases according to the first test case execution plan.

FIG. 1 shows a computer network (also referred to herein as an information processing system) 100 configured in accordance with an illustrative embodiment. The computer network 100 comprises a test management system 101, test selection and prioritization system 105, test case repository 106, and test systems 102-N. The test management system 101, test selection and prioritization system 105, test case repository 106, and test systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a test selection and prioritization system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the test systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The test systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the test selection and prioritization system 105 are one or more input-output devices, which illustratively comprise keyboards, displays or other types of input-output devices in any combination. Such input-output devices can be used, for example, to support one or more user interfaces to the test selection and prioritization system 105, as well as to support communication between the test selection and prioritization system 105 and other related systems and devices not explicitly shown. For example, a dashboard may be provided for a user to view a progression of the execution of the test selection and prioritization system 105. One or more input-output devices may also be associated with any of the test systems 102-N.

Additionally, the test selection and prioritization system 105 in the FIG. 1 embodiment is assumed to be implemented using at least one processing device. Each such processing device generally comprises at least one processor and an associated memory, and implements one or more functional modules for controlling certain features of the test selection and prioritization system 105.

More particularly, the test selection and prioritization system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the test selection and prioritization system 105 to communicate over the network 104 with the test management system 101, test case repository 106, and test systems 102-N and illustratively comprises one or more conventional transceivers.

A test selection and prioritization system 105 may be implemented at least in part in the form of software that is stored in memory and executed by a processor, and may reside in any processing device. The test selection and prioritization system 105 may be a standalone plugin that may be included within a processing device.

It is to be understood that the particular set of elements shown in FIG. 1 for test selection and prioritization system 105 involving the test management system 101, test case repository 106, and test systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the test selection and prioritization system 105 can be on and/or part of the same processing platform.

An exemplary process of test selection and prioritization system 105 in computer network 100 will be described in more detail with reference to, for example, the flow diagram of FIG. 3.

Figure 2:
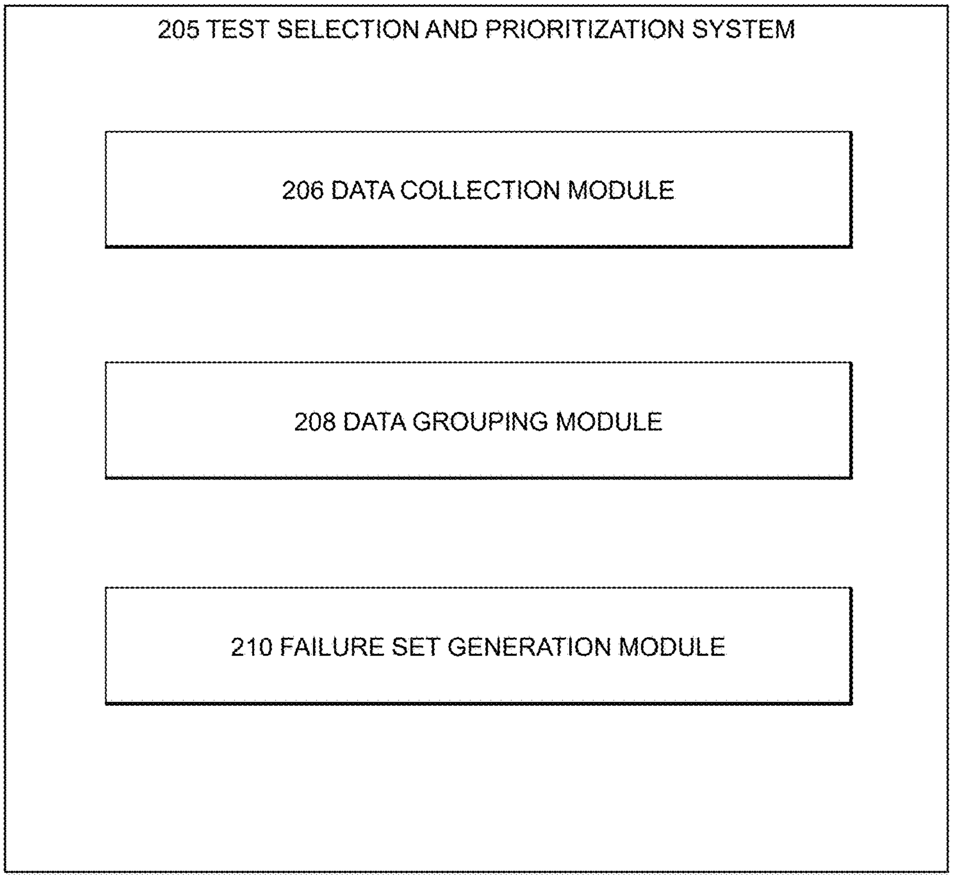
FIG. 2 shows a test selection and prioritization system in an illustrative embodiment.

FIG. 2 shows a test selection and prioritization system 205 in an illustrative embodiment. In an example embodiment, the test selection and prioritization system 205 comprises the data collection module 206, the data grouping module 208, and failure set generation module 210.

Figure 3:
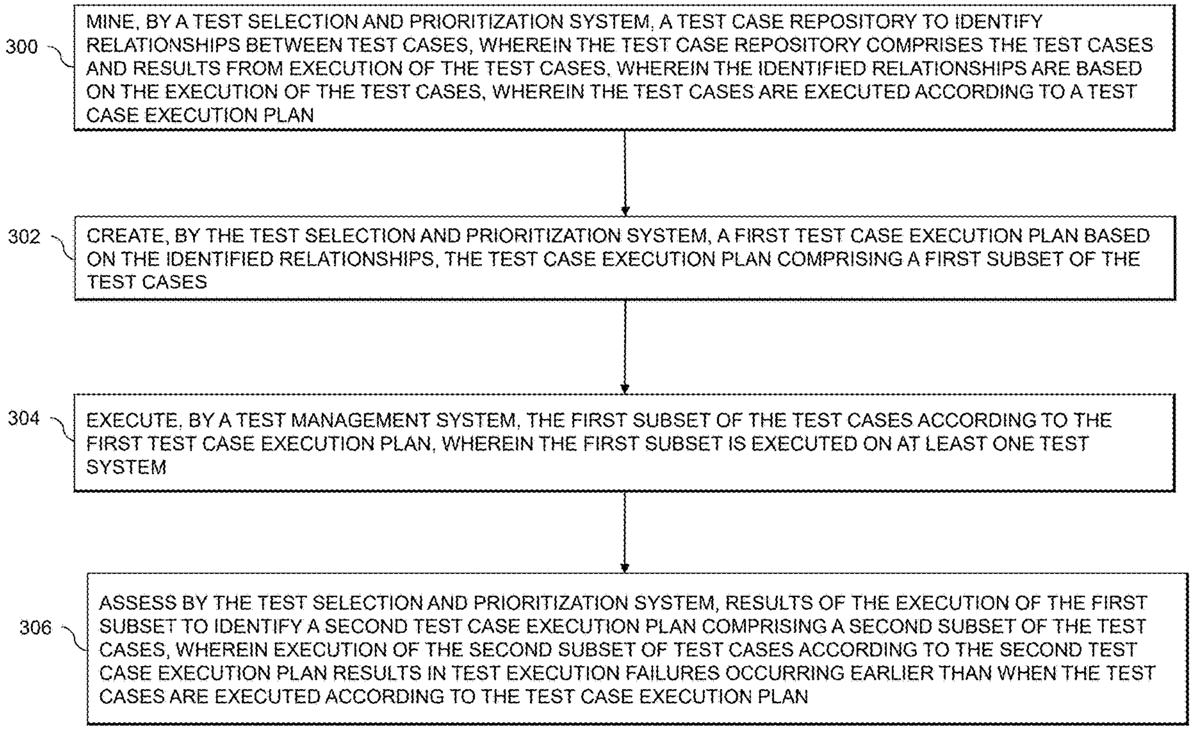
FIG. 3 shows a flow diagram of a process for a test selection and prioritization system in an illustrative embodiment.

FIG. 3 is a flow diagram of a process for execution of the test selection and prioritization system 105 in an illustrative embodiment. It is to be understood that this particular process is only an example, and additional or alternative processes can be carried out in other embodiments.

At 300, the test selection and prioritization system 105 mines a test case repository 106 to identify relationships between test cases where the identified relationships are based on the execution of the test cases, and where the test cases are executed according to a test case execution plan. In an example embodiment, the test case repository 106 comprises the test cases and results from execution of the test cases. In an example embodiment, the test outcomes in the test case repository 106 may be represented as [TestID, BuildID, ExecutionTimestamp, TestResults]. These test outcomes may be obtained for every software build.

In an example embodiment, the relationships between the test cases identify sets of co-failing test cases. In other words, the test selection and prioritization system 105 identifies those test cases, that when executed, fail together. Failed test cases generally will fail together.

In an example embodiment, the data collection module 206 accesses the test cases and the results from the test case repository 106 utilizing application programming interfaces (API) associated with the test management system. In an example embodiment, the test selection and prioritization system 105 accesses the test management system 101 as a data source to obtain the previously executed test cases. In an example embodiment, the data collection module 206 utilizes APIs associated with the test management system 101 to continuously gather the test execution records. In an example embodiment, the test execution records may comprise, but are not limited to, the test cases, and the results of the execution of the test cases.

In an example embodiment, the data collection module 206 preprocesses the test execution records to ensure consistency, remove noise, etc. For example, the data may be processed into binary values, string values, numerical values, etc. In another example embodiment, the data may be deduplicated. In an example embodiment, the data collection module 206 transforms the test execution records into a format that is suitable for the various modules (i.e., the data collection module 206, data grouping module 208, and failure set generation module 210) of the test selection and prioritization system 105 to analyze.

In an example embodiment, the data grouping module 208 groups the test cases in the test case repository 106 to capture the results of all the executed test cases (also referred to as "test cases") at a given point of time, or for a given software build. In an example embodiment, the data grouping module 208 groups the test cases according to a build identifier (for example, the build-ID associated with a software build) that is associated with the test cases. In an example embodiment, the data grouping module 208 groups the test cases according to an execution timestamp, or a timestamp range associated with the execution of the test cases. In an example embodiment, the data grouping module 208 groups the test cases into test execution sets, capturing the results of all the test cases associated with a given software build, or at a given point of time. In an example embodiment, other values may be used as a key to establish the test execution sets.

At 302, the test selection and prioritization system 105 creates a first test case execution plan based on the identified relationships, where the test case execution plan comprises a first subset of the test cases. As noted above, the relationships between the test cases identify sets of co-failing test cases.

In an example embodiment, the failure set generation module 210 identifies the sets of co-failing test cases. In an example embodiment, the failure set generation module 210 determines a plurality of associated failure sets based on the relationships between the test cases, where co-failing test cases are grouped into a respective associated failure set.

Figure 4:
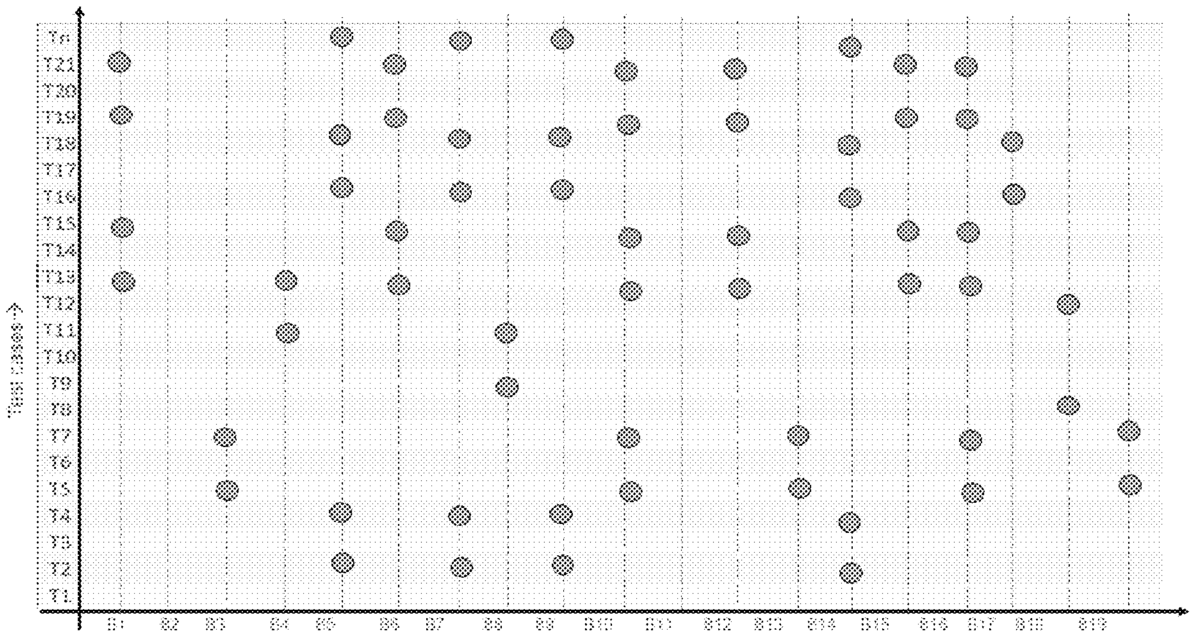
FIG. 4 illustrates test execution records over time and/or software builds in an illustrative embodiment.
Figure 5:
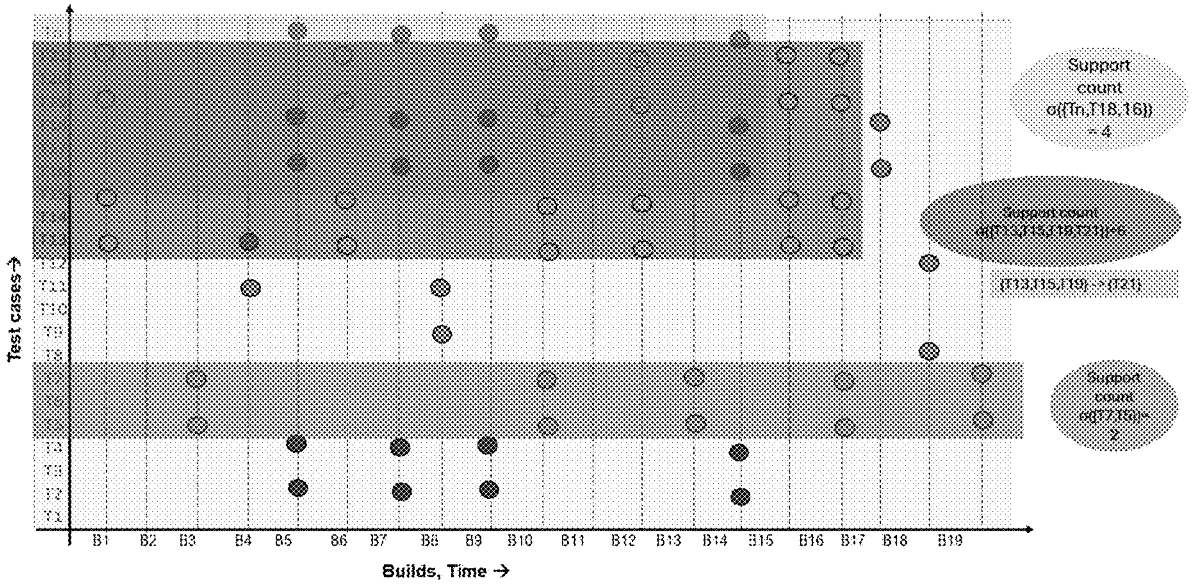
FIG. 5 illustrates identified co-failing test cases in an illustrative embodiment.

FIG. 4 illustrates test execution records over time and/or software builds. In FIG. 4, Tn represents the identification of each test case, and Bn represents the software build identifier. FIG. 5 illustrates the test execution records shown in FIG. 4 with the associated co-failing test cases identified. FIG. 5 illustrates the support count for several associated failure sets (i.e., test cases that, when executed together, failed together). For example, test case n, test case 18 and test case 16, represented as {Tn, T18, T16} in FIG. 5, failed 4 times together. Test case 13, test case 15, test case 19, and test case 21, represented as {T13, T15, T19, T21} in FIG. 5, failed 6 times together. Test case 7 and test case 5, represented as {T7, T5} in FIG. 5, failed 2 times together. Additionally, test case 13, test case 15, and test case 19, represented as {T13, T15, T19}→{T21} in FIG. 5, indicate that when test case 13, test case 15, and test case 19 fail, test case 21, represented as {T21} will also fail. Similarly, in this example, when test case 21 fails alone, test case 13, test case 15, and test case 19 may also fail.

Figure 6:
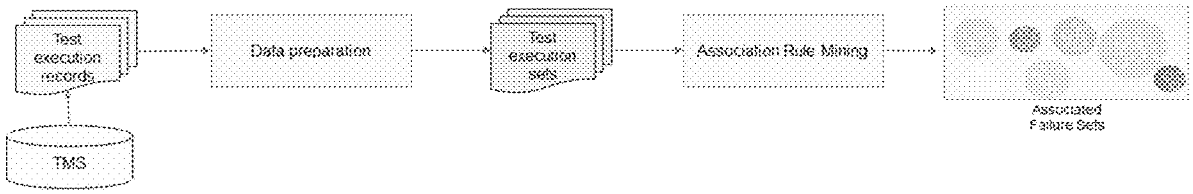
FIG. 6 illustrates a process flow for generating the associated failure sets in an illustrative embodiment.

In an example embodiment, the failure set generation module 210 determines the relationships between the test cases utilizing an association rule mining algorithm. In an example embodiment, the failure set generation module 210 identifies the co-failing test cases based on the heuristics associated with those executed test cases. In an example embodiment, the association rule mining algorithm is an Apriori algorithm. In an example embodiment, the failure set generation module 210 utilizes an association rule mining algorithm to identify associated failure sets, (or frequent itemsets). FIG. 6 illustrates a process flow for generating the associated failure sets. In FIG. 6, "TMS" represents the test case repository 106, and "data preparation" represents the data preprocessing performed by the data collection module 206 to transform the test records accessed from the test case repository 106 into a suitable format for analysis by the failure set generation module 210.

In an example embodiment, the failure set generation module 210 generates the associated failure sets comprising itemsets, support, and confidence. The "support" is the number of times the group of failing test cases failed together. For example, an itemset of {t4, t6, t9} indicates test case 4, test case 6, and test case 9 failed together, support=5 indicates that t4, t6, and t9 failed 5 times when executed together, and confidence=0.08 indicates that t4, t6, and t9 failed 80% of the time when these three test cases are executed together. FIG. 5, as explained above, illustrates the support count for several associated failure sets (i.e., test cases that, when executed together, failed together).

In an example embodiment, the failure set generation module 210 creates the first test case execution plan by selecting at least one test case each from at least a subset of the plurality of associated failure sets. For example, when a new software change is introduced, or a testing objective is defined, the failure set generation module 210 may select one test case candidate (or more than one) from each of the associated failure sets for inclusion (or from only some of the associated failure sets) in the first test case execution plan. In another example embodiment, the failure set generation module 210 may select one test case candidate from each of the associated failure sets (or only some of the associated failure sets) using a round robin selection process. In yet another example embodiment, the failure set generation module 210 may select one test case candidate from each of the associated failure sets (or only some of the associated failure sets) based on the highest failing frequency associated with the test case candidates. In other words, the failure set generation module 210 may select the test case with the highest failure frequency from each of the associated failure sets (or only some of the associated failure sets). In an example embodiment, the failure set generation module 210 may select one or more test case candidates from each of the associated failure sets (or only some of the associated failure sets) for inclusion in the first test case execution plan.

In an example embodiment, the failure set generation module 210 may iteratively and continually update the plurality of associate failure sets based at least one of changes to the test cases and results from execution of the test cases in the test case repository 106, test cases added to the test case repository 106 and associated results from execution of the added tests, and test cases removed from the test case repository 106. For example, test cases may be added or removed from the test case repository 106. Test cases in the test case repository 106 may also be modified. In an example embodiment, the failure set generation module 210 continually updates the associate failure sets based on the test cases in the test case repository 106 and the execution results of the execution of those test cases in the test case repository 106. In an example embodiment, the test selection and prioritization system 105 utilizes the test execution outcomes to dynamically determine which test cases should be added to a test case execution plan. Thus, there is a higher probability that the test cases that will generate failures when executed will be executed earlier in the testing process. This improves the efficiency of detecting and resolving defects in the software.

At 304, the test management system 101 executes the first subset of the test cases according to the first test case execution plan, where the first subset is executed on at least one test system 102-N. Once the test selection and prioritization system 105 has generated the first test case execution plan, the test management system 101 executes the first subset of the test cases according to that first test case execution plan. In an example embodiment, when a new software build needs to be tested, and/or there is a new testing requirement, after the test management system 101 performs a few executions of test cases related to the new software build and/or new testing requirement, the test selection and prioritization system 105 generates the test case execution plans incorporating any new test cases relevant to the new software build and/or new testing requirement.

Figure 7:
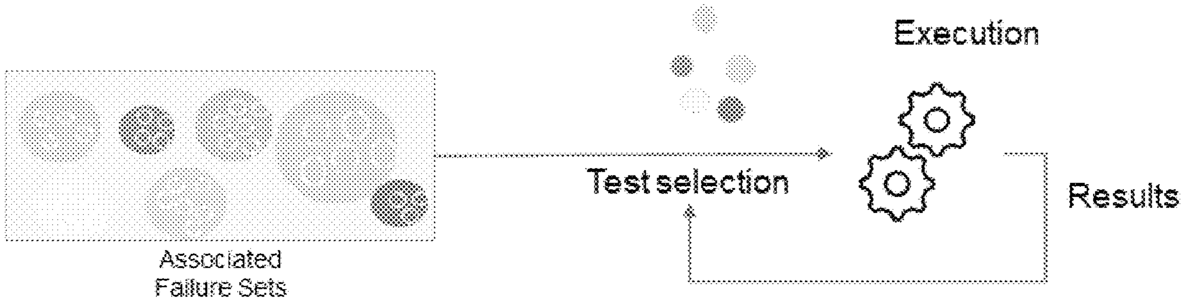
FIG. 7 illustrates an iterative process of executing and optimizing test case execution plans in an illustrative embodiment.

At 306, the test selection and prioritization system 105 assesses the results of the execution of the first subset to identify a second test case execution plan comprising a second subset of the test cases. FIG. 7 illustrates how the test selection and prioritization system 105 selects test cases from the associated failure sets to create test case execution plans, executes those selected test cases according to the test case execution plans, and then iteratively assesses and analyzes the results to further (create and) optimize the test case execution plans. In an example embodiment, the test selection and prioritization system 105 assesses the outcome of the execution of the first test case execution plan to determine which test cases should be included into the second test case execution plan to increase the probability that the test cases that will fail when executed, will fail earlier in the test cycle.

In an example embodiment, the test selection and prioritization system 105 monitors failures occurring during the execution of the first subset of the test cases according to the first test case execution plan to identify the second test case execution plan comprising the second subset of the test cases. In an example embodiment, the test selection and prioritization system 105 provides to the test management system, the second test case execution plan for execution of the second subset of the test cases by the test management system. Thus, the execution of the second subset of test cases according to the second test case execution plan results in test execution failures occurring earlier than when the test cases are executed according to the test case execution plan.

In an example embodiment, the test selection and prioritization system 105 continuously monitors at least one of precision, recall, and F-score associated with the failures occurring during the execution of the first subset of the test cases according to the first test case execution plan. For example, if there are 100 test cases executed and 70 of those test cases fail, the precision is 70/100. The recall represents how many failures occurred in the execution of those 100 test cases, for example the recall may be 120 failures. The F-score (also known as F-measure) is the mean of both the precision and the recall.

In an example embodiment, the test selection and prioritization system 105 identifies at least one failing test case associated with the first subset of the test cases, where an associated failure set comprises the failing test case. The test selection and prioritization system 105 then adds at least one other failing test case from the associated failure set to the second subset of the test cases. In an example embodiment, based on the execution results of the first test case execution plan, represented as TSi, the failure set generation module 210 generates the second test execution plan, represented as TSi+1, by selecting one or more test cases from the associated failure set comprising a failing test case. For example, the test selection and prioritization system 105 selects a seed test case from a first associated failure set, and adds that seed test case to the first test case execution plan. During execution of the test cases in the first test case execution plan on the test system 102-N, that first test case fails. The test selection and prioritization system 105 selects one or more test cases from the first associated failure set for inclusion in the second test case execution plan. In an example embodiment, the remaining test cases in the first associated failure set will be ranked according to, for example, failing frequency, and selected for a third test case execution plan, represented as TSi+2. This process is iteratively repeated, and if testing time permits, a N test case execution plan, represented as TSi+N, will be created using test cases that have had zero failing frequency when executed.

Thus, in an example embodiment, the test selection and prioritization system 105 prioritizes the test cases for execution so that test case failures occur earlier in the testing process. For example, the test selection and prioritization system 105 selects a seed test case from a first associated failure set. The seed test case may be selected via a round robin selection process, or the test selection and prioritization system 105 may select the test case with the highest fail frequency. The next group of test cases to be prioritized may be the remaining test cases in the first associated failure set from which the seed test case was selected. The next group of test cases to be prioritized may be the test cases that have a failure count greater than zero. The lowest prioritized group of test cases may be the test cases with zero failure counts.

In an example embodiment, the test selection and prioritization system 105 iteratively performs the steps of mining the test case repository 106, creating test case execution plans, executing test cases according to the test case execution plans, and assessing the outcomes of those executed test cases to create an optimized test case execution plan that optimizes early detection of test case failures. Thus, the test selection and prioritization system 105 creates the first test case execution plan, executes the test cases in that first test case execution plan, and uses the results of those executions to create the second test case execution plan. The results of the execution of the second test case execution plan are used to create a third test case execution plan, and so on, such that the results of each executed test case plan are iteratively used to create the subsequent test case plan. The optimized test case execution plan is created to dynamically select and prioritize execution of those test cases that will result in detecting failures earlier in the testing cycle. The test selection and prioritization system 105 monitors the test results and outcomes to obtain new test data, and incorporate that new test data into the historical test data. For example, a system that automates the steps of software development, such as building testing and deploying, accepts the recommendation (of test cases to prioritize for execution) provided by the test selection and prioritization system 105, and executes that recommendation as one of the jobs the automated software development system execution. The test execution engine associated with the automated software development system performs the step of executing the prioritized test cases. The outcomes of those executed test cases are analyzed by the test selection and prioritization system 105, refined, and that updated recommendation is provided by the test selection and prioritization system 105 to the automated software development system. The test selection and prioritization system 105 operates as a continuous feedback loop as illustrated in FIG. 7. This increases the accuracy of the testing by finding the defects in the software build quickly and earlier in the testing process.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve ranking and prioritizing the execution of test cases. These and other embodiments can effectively improve testing for each build release and product release relative to conventional approaches. For example, embodiments disclosed herein provide a method and a system for a test selection and prioritization system that can leverage adaptive association rule mining techniques. Embodiments disclosed herein prioritize the execution of test cases to detect failures earlier in the testing process. Embodiments disclosed herein are versatile, customizable, and applicable across various software development projects. Embodiments disclosed herein are adaptive to different testing goals and software contexts to provide tailored testing solutions. It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of the information processing system 100, these platforms may also be used to implement at least portions of other information processing systems in other embodiments.

Figure 8:
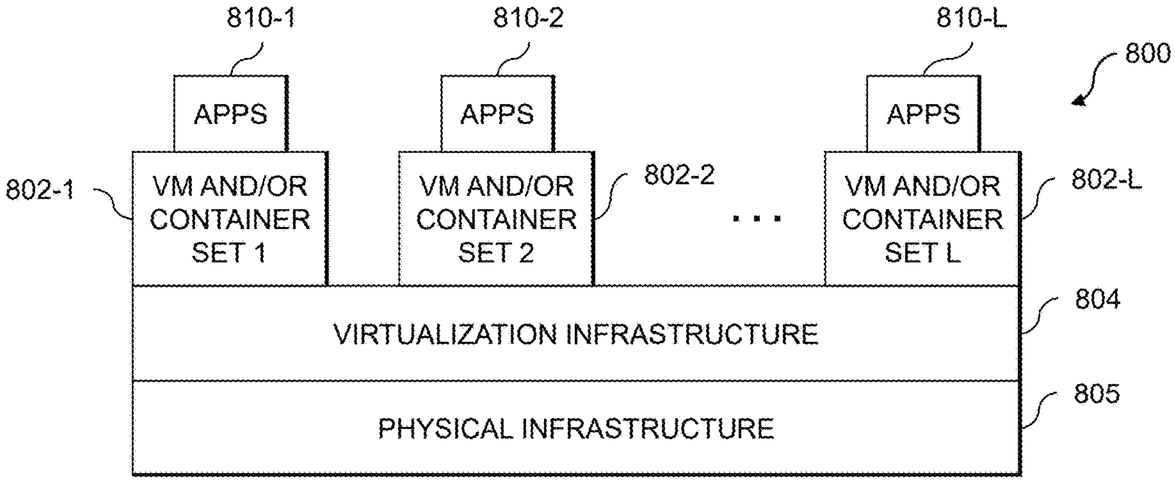
FIGS. 8 and 9 show examples of processing platforms that may be utilized to implement at least a portion of a test selection and prioritization system embodiments.
Figure 9:
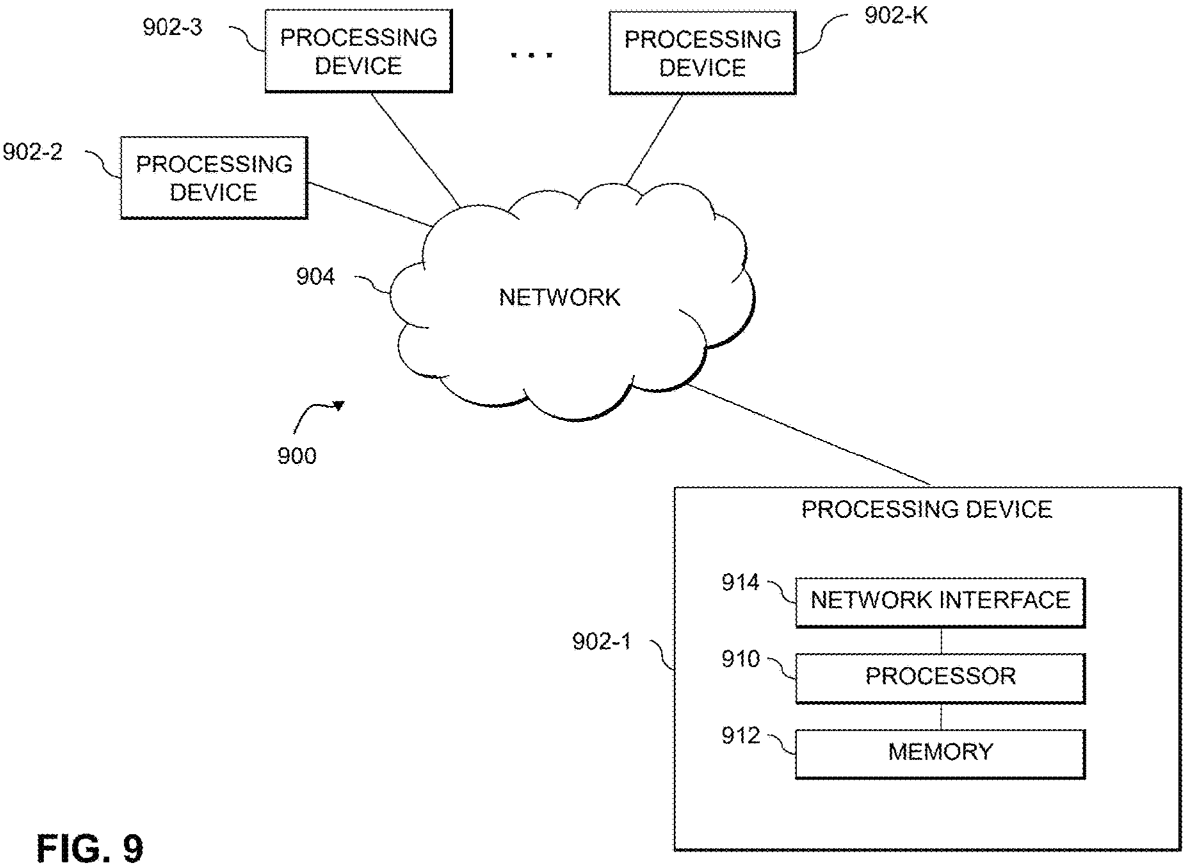

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, where the hypervisor platform has an associated virtual infrastructure management system. The underlying physical machines comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of the information processing system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a microcontroller, an application-specific integrated circuit (ASIC), a field-programmable gate array (FPGA) or other type of processing circuitry, as well as portions or combinations of such circuitry elements.

The memory 912 comprises random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

mining, by a test selection and prioritization system, a test case repository to identify relationships between test cases, wherein the test case repository comprises the test cases and results from execution of the test cases, wherein the identified relationships are based on the execution of the test cases, and wherein the test cases are executed according to a test case execution plan;

determining, by a failure set generation module of the test selection and prioritization system, a plurality of associated failure sets based on the relationships between the test cases, wherein co-failing test cases are grouped into a respective associated failure set;

creating, by the test selection and prioritization system, a first test case execution plan by selecting a seed test case from at least one of the plurality of associated failure sets for inclusion in the first test case execution plan, the first test case execution plan comprising a first subset of the test cases including the seed test case;

executing, by a test management system, the first subset of the test cases according to the first test case execution plan, wherein the first subset is executed on at least one test system;

monitoring, by the test selection and prioritization system, failures occurring during the executing of the first subset of the test cases on the at least one test system;

identifying, by the test selection and prioritization system, the seed test case as a failing test case during execution of the first subset of the test cases on the at least one test system;

selecting, by the test selection and prioritization system, at least one other test case from the associated failure set comprising the seed test case in response to identifying the seed test case as a failing test case during said execution; and generating, by the test selection and prioritization system, a second test case execution plan comprising a second subset of the test cases, the second subset including the at least one other selected test case from the associated failure set, wherein the method is implemented by at least one processing device comprising a processor coupled to a memory.

2. The method of claim 1 further comprising:

providing, by the test selection and prioritization system to the test management system, the second test case execution plan for execution of the second subset of the test cases by the test management system.

3. The method of claim 2 further comprising:

iteratively mining, creating, executing and assessing to create an optimized test case execution plan that optimizes early detection of test case failures.

4. The method of claim 1 wherein mining, by the test selection and prioritization system, the test case repository comprises:

accessing, by a data collection module, the test cases and the results from the test case repository utilizing application programming interfaces (API) associated with the test management system, wherein the test selection and prioritization system comprises the data collection module.

5. The method of claim 1 wherein mining, by the test selection and prioritization system, the test case repository comprises:

grouping, by a data grouping module, the test cases according to a build identifier associated with the test cases, wherein the test selection and prioritization system comprises the data collection module.

6. The method of claim 1 wherein mining, by the test selection and prioritization system, the test case repository comprises:

grouping, by a data grouping module, the test cases according to a time stamp range associated with an execution timestamp associated with the execution of the test cases, wherein the test selection and prioritization system comprises the data collection module.

7. The method of claim 1 wherein the relationships between the test cases identify sets of co-failing test cases.

8. The method of claim 1 wherein creating, by the test selection and prioritization system, the first test case execution plan comprises:

determining the relationships between the test cases utilizing an association rule mining algorithm.

9. The method of claim 8 wherein the association rule mining algorithm is an Apriori algorithm.

10. The method of claim 1 wherein creating, by the test selection and prioritization system, the first test case execution plan comprises:

determining, by a failure set generation module, a plurality of associated failure sets based on the relationships between the test cases, wherein co-failing test cases are grouped into a respective associated failure set, wherein the test selection and prioritization system comprises the failure generation module.

11. The method of claim 10 wherein the associated failure sets comprise itemsets, support, and confidence.

12. The method of claim 10 further comprising:

creating the first test case execution plan by selecting at least one test case each from at least a subset of the plurality of associated failure sets.

13. The method of claim 12 further comprising:

selecting the at least one test case each from the at least a subset of the plurality of associated failure sets according to a round robin selection process.

14. The method of claim 12 further comprising:

selecting the at least one test case each from the at least a subset of the plurality of associated failure sets according to a highest failing frequency associated with each of the test cases in the plurality of associated failure sets.

15. The method of claim 10 further comprising:

updating the plurality of associated failure sets based on at least one of changes to the test cases and results from execution of the test cases in the test case repository, test cases added to the test case repository and associated results from execution of the added tests, and test cases removed from the test case repository.

16. The method of claim 1 wherein assessing by the test selection and prioritization system, results of the execution of the first subset comprises:

monitoring failures occurring during the execution of the first subset of the test cases according to the first test case execution plan to identify the second test case execution plan comprising the second subset of the test cases.

17. The method of claim 16 further comprising:

identifying at least one failing test case associated with the first subset of the test cases, wherein an associated failure set comprises the at least one failing test case; and adding at least one other failing test case from the associated failure set to the second subset of the test cases.

18. The method of claim 16 further comprising:

monitoring at least one of precision, recall, and F-score associated with the failures occurring during the execution of the first subset of the test cases according to the first test case execution plan.

19. A system comprising:

at least one processing device comprising a processor coupled to a memory;

the at least one processing device being configured:

to mine, by a test selection and prioritization system, a test case repository to identify relationships between test cases, wherein the test case repository comprises the test cases and results from execution of the test cases, wherein the identified relationships are based on the execution of the test cases, wherein the test cases are executed according to a test case execution plan;

to determine, by a failure set generation module of the test selection and prioritization system, a plurality of associated failure sets based on the relationships between the test cases, wherein co-failing test cases are grouped into a respective associated failure set;

to create, by the test selection and prioritization system, a first test case execution plan by selecting a seed test case from at least one of the plurality of associated failure sets for inclusion in the first test case execution plan, the first test case execution plan comprising a first subset of the test cases including the seed test case;

to execute, by a test management system, the first subset of the test cases according to the first test case execution plan, wherein the first subset is executed on at least one test system;

to monitor, by the test selection and prioritization system, failures occurring during the executing of the first subset of the test cases on the at least one test system;

to identify, by the test selection and prioritization system, the seed test case as a failing test case during execution of the first subset of the test cases on the at least one test system;

to select, by the test selection and prioritization system, at least one other test case from the associated failure set comprising the seed test case in response to identifying the seed test case as a failing test case during said execution; and to generate, by the test selection and prioritization system, a second test case execution plan comprising a second subset of the test cases, the second subset including the at least one other selected test case from the associated failure set.

20. A computer program product comprising a non-transitory processor-readable storage medium having stored therein program code of one or more software programs, wherein the program code when executed by at least one processing device causes said at least one processing device:

to mine, by a test selection and prioritization system, a test case repository to identify relationships between test cases, wherein the test case repository comprises the test cases and results from execution of the test cases, wherein the identified relationships are based on the execution of the test cases, wherein the test cases are executed according to a test case execution plan;

to determine, by a failure set generation module of the test selection and prioritization system, a plurality of associated failure sets based on the relationships between the test cases, wherein co-failing test cases are grouped into a respective associated failure set;

to create, by the test selection and prioritization system, a first test case execution plan by selecting a seed test case from at least one of the plurality of associated failure sets for inclusion in the first test case execution plan, the first test case execution plan comprising a first subset of the test cases including the seed test case;

to execute, by a test management system, the first subset of the test cases according to the first test case execution plan, wherein the first subset is executed on at least one test system;

to monitor, by the test selection and prioritization system, failures occurring during the executing of the first subset of the test cases on the at least one test system;

to identify, by the test selection and prioritization system, the seed test case as a failing test case during execution of the first subset of the test cases on the at least one test system;

to select, by the test selection and prioritization system, at least one other test case from the associated failure set comprising the seed test case in response to identifying the seed test case as a failing test case during said execution; and to generate, by the test selection and prioritization system, a second test case execution plan comprising a second subset of the test cases, the second subset including the at least one other selected test case from the associated failure set.

* * * * *